United States Patent [19]

Beauviala

[11] Patent Number: 4,877,200

[45] Date of Patent: Oct. 31, 1989

[54] CINE CAMERA EMPLOYING INTERCHANGEABLE FILM MAGAZINES WITH DISPLACEMENT OF THE SPINDLES OF THE FILM TAKE-OFF AND TAKE-UP REELS

[75] Inventor: Jean-Pierre Beauviala, Grenoble, France

[73] Assignee: Aaton, R.G., Grenoble, France

[21] Appl. No.: 185,077

[22] Filed: Apr. 22, 1988

[30] Foreign Application Priority Data

Apr. 28, 1987 [FR] France .................................. 87 06000

[51] Int. Cl.[4] .............................................. G03B 1/04
[52] U.S. Cl. ..................................... 242/205; 352/72; 352/166
[58] Field of Search ............... 242/200, 201, 205, 199; 352/72, 78 R, 166; 354/174, 275, 212

[56] References Cited

U.S. PATENT DOCUMENTS

| | | | |
|---|---|---|---|
| 2,135,026 | 11/1938 | Becker | 242/205 |
| 3,386,676 | 6/1968 | Sotani et al. | 242/200 |
| 3,947,187 | 3/1976 | Murray, Jr. | 242/205 X |

FOREIGN PATENT DOCUMENTS

| | | |
|---|---|---|
| 3020643 | 12/1981 | Fed. Rep. of Germany . |
| 1415570 | 9/1965 | France . |
| 2396986 | 2/1979 | France . |
| 2498771 | 7/1982 | France . |

*Primary Examiner*—David Werner
*Attorney, Agent, or Firm*—McAulay Fisher Nissen & Goldberg

[57] ABSTRACT

A cine camera employing interchangeable film magazines with displacement of the spindles of the film take-off and take-up reels, comprises an electric motor mounted on the body of the camera and of which the horizontal driven shaft is fast with a driving magnetic plate of a magnetic coupler which is housed in an opening in the body coaxial with the axis of the motor and of the shaft. The outer front face of the driving magnetic plate is substantially flush with the outer face of the body which is adjacent the outer face of the wall of the casing of the interchangeable magazine. The magnetic coupler comprises, in the magazine, a driven magnetic plate of which the axis merges with that of the driving magnetic plate. The driven magnetic plate is fast with a driving pinion and the driven magnetic plate and the driving pinion are mounted to rotate, in the magazine, about an axis which is merged with the axis of the drive motor. The driving pinion is coupled to a driven pinion which is fast with the spindle of the take-up reel and coaxial therewith and this spindle and the driven pinion are mounted to rotate jointly on a plate which is itself mounted to pivot about the axis of the driven plate/driving pinion assembly.

10 Claims, 2 Drawing Sheets

CINE CAMERA EMPLOYING INTERCHANGEABLE FILM MAGAZINES WITH DISPLACEMENT OF THE SPINDLES OF THE FILM TAKE-OFF AND TAKE-UP REELS

BACKGROUND OF THE INVENTION

The present invention relates to a cine camera employing interchangeable film magazines with displaceable spindles for displacement of the film take-off and take-up reels.

Cine cameras with interchangeable magazines are already known in which spindles for the take-off and take-up reels move as the film is consumed. Such displacement follows the variation in the diameter of the reels so that the spindle of the take up reel is displaced as the diameter of the take up reel increases in the direction of the take off reel for which the diameter decreases. Simultaneously, the spindle of the take off reel is displaced in the same sense owing to the provision of connecting means between the spindles of the two reels in order to ensure simultaneous translation thereof. This arrangement makes it possible to produce relatively compact magazines since the volume occupied at any instant by the two take-off and take-up reels is less than the volume which would have to be reserved for these reels if the spindles thereof were mounted in a fixed position in the magazine.

In magazines of this type the spindles of the take up reel is driven in rotation by means of an independent electric motor housed in the magazine. Such an arrangement obviously presents drawbacks since it is necessary to provide an electrical supply of the motor located inside the magazine from the battery housed in the body of the camera and furthermore each magazine is relatively heavy and cumbersome since it is necessary to provide one motor per magazine.

SUMMARY OF THE INVENTION

It is an object of the present invention to overcome these drawbacks by providing a cine camera of particularly simple design having interchangeable magazines which are considerably lightened and simplified.

To that end this cine camera employing interchangeable film magazines with displaceable spindles for the film take off and take up reels, these spindles being rendered fast in translation by connecting means is characterized in that it comprises an electric motor mounted on the body of the camera and having horizontal driven shaft which is fast with a driving magnetic plate of a magnetic coupler which is housed in an opening in the body coaxial with the axis of the motor and of the shaft. The outer front face of the driving magnetic plate is substantially flush with the outer face of the body which is adjacent to the outer face of the wall of the casing of the interchangeable magazine and the magnetic coupler comprises, in the magazine, a driven magnetic plate and of which the axis merges with that of the driving magnetic plate the driven magnetic plate is fast with a driving pinion and the driven magnetic plate and the driving pinion are mounted to rotate, in the magazine, about an axis which being merged with the axis of the drive motor, the driving pinion is coupled to a driven pinion which is fast with the spindle of the take-up reel and coaxial therewith and this spindle and the driven pinion are, mounted to rotate jointly on a plate which is itself mounted to pivot about the axis of the driven plate/driving pinion assembly.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
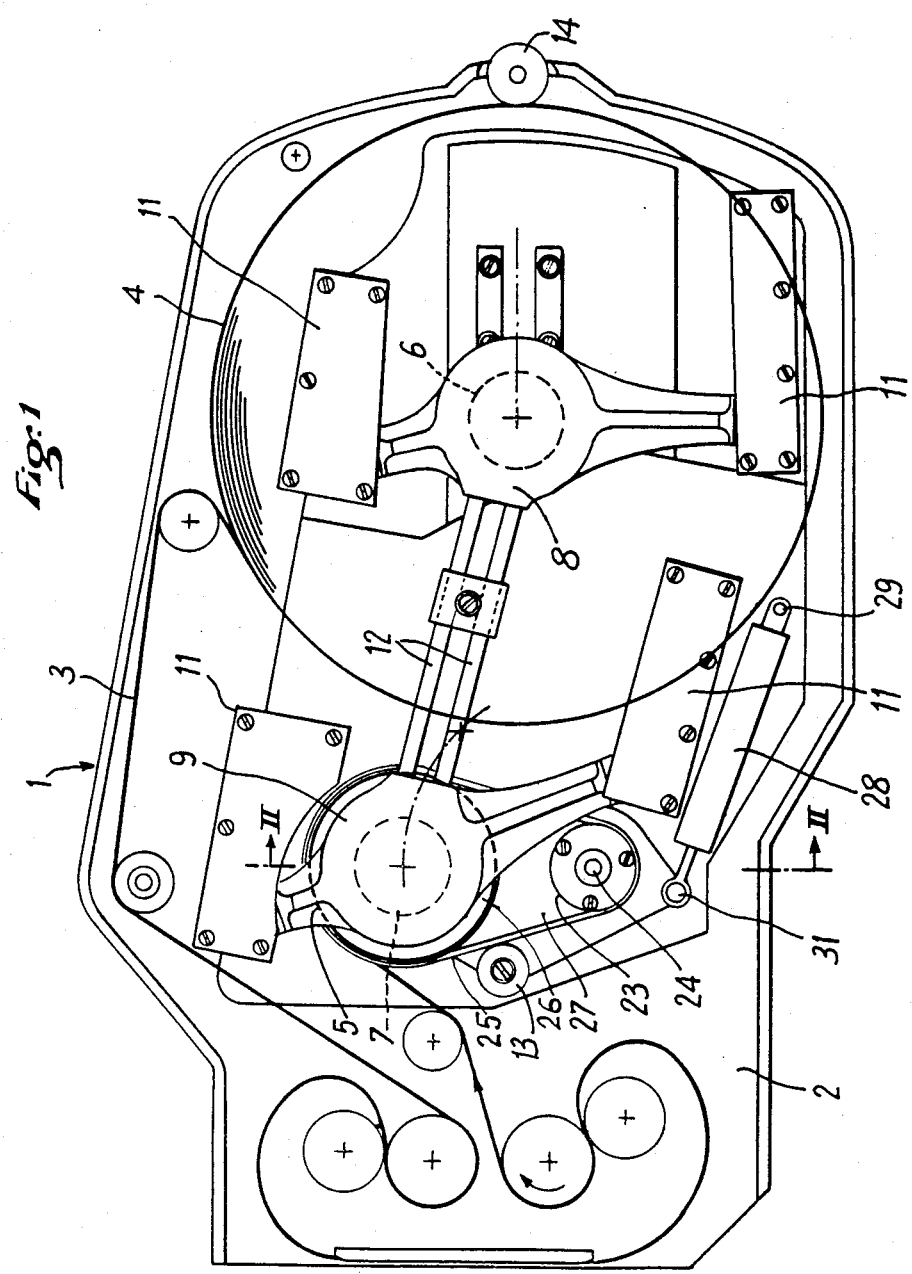
FIG. 1 is a simplified view in elevation of an interchangeable magazine with displacement of the spindles of the reels for a cine camera according to the invention.

Referring now to the drawings the cine camera according to the invention employs interchangeable magazines 1 which comprise a casing 2 inside which is stored a certain length of wound cinematographic film 3, before being printed, to constitute a take off reel 4. The film 3 passes in conventional manner over take off rollers so as to be intermittently stopped in front of a filming window located to the rear of the lens mounted on the body of the camera in which the magazine 1 is engaged. After having been printed the film is wound on itself to constitute a take-up reel 5.

The take off reel 4 and take-up reel 5 are respectively wound on horizontal spindles 6, 7, parallel to each other and which are mounted in respective bearings 8, 9. These bearings 8, 9 are fast with arms engaged in guiding elements 11 fixed to the casing 2 and they are also connected by coupling rods 12. Consequently, as the printed film is wound to constitute the take-up reel 5 and as the diameter thereof increases, the spindle 7 of the take-up reel is displaced towards the right in FIG. 1 further to the reaction, exerted on the reel formed which abuts by its lateral surface on a stop 13 located on the filming window side i e. opposite the take off reel 4, for example below and to the left of the bearing 9. This stop 13 is constituted by a roller mounted on a ball bearing or the like, in order to reduce friction.

Due to the coupling between the bearings 8 and 9 by means of rods 12 the displacement of spindle 7 towards the right is translated by a concomitant displacement of the spindle 6 of the take-off reel 4 likewise towards the right. Consequently, as the diameter of the take-up reel 5 increases and the diameter of the take-off reel 4 decreases, the two spindles 7, 6 of these two reels are displaced simultaneously towards the right, To some extent, the increase in diameter of the take-up reel 5 is compensated for by the correlative reduction in the diameter of the take-off reel 4. This take-off reel 4 is maintained in contact with a stop 14 located in the extreme right hand part of the casing 2, i e. opposite the take-up reel 5, this stop 14 being constituted by a roller mounted on an appropriate bearing to reduce, friction.

Figure 2:
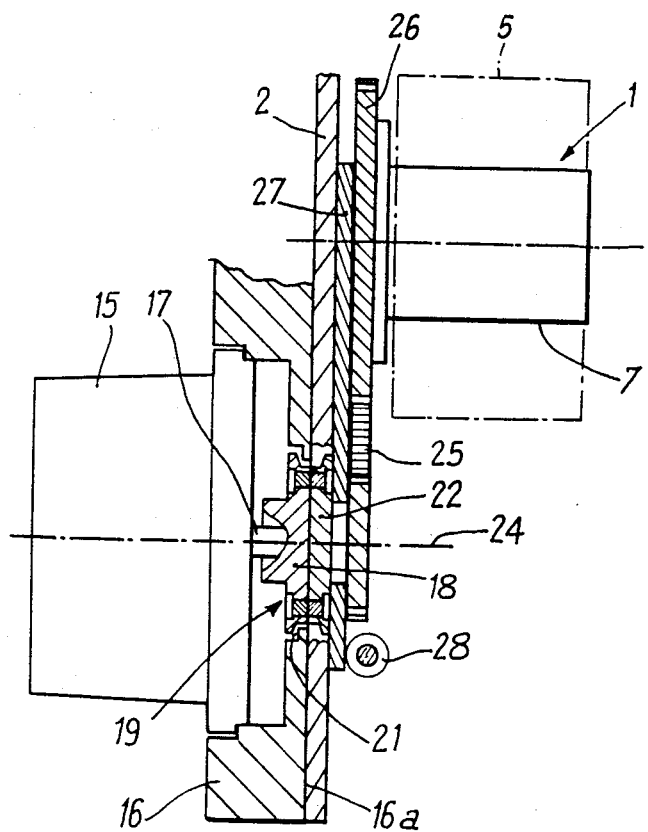
FIG. 2 is a view in section along line II—II of FIG. 1.

As is shown more particularly in FIG. 2, the spindle 7 of the take-up reel 5 is driven, in rotation from an electric motor 15 mounted on the body 16 of the camera. The horizontal driven shaft 17 of the drive motor 15 is fast with a driving magnetic plate 18 of a magnetic coupler 19, of any appropriate type, which is housed in an opening in the body 16 coaxial with the axis of the motor 15 and of the shaft 17. The outer front face of the driving magnetic plate 18 is substantially flush with the outer face 16a of the body 16 which is adjacent the outer face of the wall of the casing 2 of the interchangeable magazine. The magnetic coupler 19 comprises, in the magazine 1, a driven magnetic plate 22 which is housed in an opening in the wall of the casing 2 and which is mounted against the driving magnetic plate 18 or in the immediate vicinity thereof, when the magazine 1 is fitted in the body 16 of the camera. In this position, the axis of the driven magnetic plate 22 merges with that of the driving magnetic plate 18. The driven magnetic plate 22 is fast, inside the magazine 1, with a driving pinion 23 and the driven magnetic plate 22 and the driving pinion 23 are mounted to rotate, in magazine 1, about an axis 24 which is merged with the axis of drive motor 15. The driving pinion 23 is coupled, via a synchronous belt 25, with a driven pinion 26 of larger diameter which is fast with the spindle 7 of the take-up reel and coaxial therewith. The spindle 7 and the driven pinion 26 are mounted jointly to rotate on a plate 27 which is itself mounted to pivot about the axis 24 of an assembly formed by the driven plate 22/driving pinion 23.

Consequently, according to the foregoing description, it may be seen that the driving movement of the spindle 7 of the take-up reel 5 is obtained from the motor 15 which is borne by the body 16 of the camera. Consequently, not every magazine 1 contains an associated electric motor, which reduces its weight and simplifies the problems of electrical supply. As the take up reel 5 increases in diameter, the plate 27 pivots progressively in a clockwise direction about axis 24, since the take up reel 5 is in abutment against the roller thrust bearing 13. This pivoting movement provokes a progressive displacement of the spindle 7 towards the right and the correlative displacement towards the right of spindle 6 of the take-off reel 4 which always remains in contact with the roller thrust bearing 14.

A damping member 28 of any appropriate type is preferably connected on the one hand to the casing 2, about a pivot axis 29, and, on the other hand, to the plate 27, below the pivot axis 24 of this plate, about a pivot axis 31. This damping member ensures a braking of the movements and avoids any sudden movement.

I claim:

1. A cine camera for use with interchangeable film magazines having a casing therein, displaceable spindles for a film take-off reel and for a film take-up reel, and connection means for rendering the spindles fast in translation, each said interchangeable film magazine having a wall with an outer face, comprising:

an electric motor mounted on the body of the camera, and said electric motor being coupled with a horizontal driven shaft fast with a driving magnetic plate of a magnetic coupler housed in an opening in said camera body and having an axis coaxial with the axis of the motor and the axis of said shaft, and said camera body having an outer face;

said driving magnetic plate having an outer front face which is substantially flush with the outer face of said camera body, said outer face of said camera body being fast with said take-up reel and said spindle thereof adjacent to the outer face of the wall of the casing of said interchangeable film magazines;

said magnetic coupler comprising a driving pinion, a driven magnetic plate in said magazine, said driven magnetic plate having an axis merging with the axis of said driving magnetic plate, said driven magnetic plate being fast with said driving pinion, said driven magnetic plate and said driving pinion being mounted to rotate in said magazine about an axis which is merged with the axis of said drive motor;

a driven pinion, coupled with said driving pinion and being coaxial therewith, said driven pinion being fast with the take-up reel spindle; and means mounting said take-up reel spindle and said driven pinion to rotate jointly on a pivot plate, a driven plate forming with said driving pinion a driven plate-driving pinion assembly, and said pivot plate being mounted to pivot about the axis of the driven plate-driving pinion assembly.

2. A cine camera according to claim 1, including a stop in said magazine casing, said stop including a roller mounted on a bearing against which said take-up reel abuts, said stop being located on a filming window side and opposite to said take-off reel.

3. A cine camera according to claim 2, comprising a damping means connected to said magazine casing and to said pivot plate below the pivot axis of said driven plate—driving pinion assembly.

4. A cine camera according to claim 1, including a synchronous belt coupling said driving pinion to said driven pinion, having a diameter greater than the diameter of said driving pinion.

5. A cine camera according to claim 4, including a stop in said magazine casing, said stop being constituted by a roller mounted on a bearing, against which said take-off reel abuts, and said stop being located opposite said take-up reel.

6. A cine camera according to claim 4, comprising a damping means connected to said magazine casing and to said pivot plate below the pivot axis of said driven plate—driving pinion assembly.

7. A cine camera according to claim 5, comprising a damping means connected to said magazine casing and to said pivot plate below the pivot axis of said driven plate—driving pinion assembly.

8. A cine camera according to claim 1, comprising a damping means connected to said magazine casing and to said pivot plate below the pivot axis of said driven plate—driving pinion assembly.

9. A cine camera according to claim 8, wherein said damping means is connected about a pivot axis to said casing.

10. A cine camera according to claim 1, wherein the outer face of the driving magnetic plate is substantially flush with the outer face of the body of the camera which is adjacent to the outer face of the wall of said casing.

* * * * *